United States Patent
Grinrod (10) Patent No.: US 10,655,042 B2
(45) Date of Patent: May 19, 2020

(54) WELLBORE STRENGTHENING ADDITIVE AND USES THEREOF

(71) Applicant: SCHLUMBERGER NORGE AS, Sandnes (NO)

(72) Inventor: Anders Grinrod, Sandnes (NO)

(73) Assignee: SCHLUMBERGER NORGE AS, Tananger (NO)

( * ) Notice: Subject to any disclaimer, the term of this patent is extended or adjusted under 35 U.S.C. 154(b) by 0 days.

(21) Appl. No.: 15/349,637

(22) Filed: Nov. 11, 2016

(65) Prior Publication Data

US 2017/0137690 A1    May 18, 2017

Related U.S. Application Data

(60) Provisional application No. 62/255,088, filed on Nov. 13, 2015.

(51) Int. Cl.

| | |
|---|---|
| *C09K 8/035* | (2006.01) |
| *C09K 8/508* | (2006.01) |
| *C09K 8/575* | (2006.01) |
| *C09K 8/514* | (2006.01) |
| *C09K 8/565* | (2006.01) |
| *C09K 8/502* | (2006.01) |
| *C09K 8/57* | (2006.01) |
| *C09K 8/08* | (2006.01) |
| *C09K 8/32* | (2006.01) |
| *E21B 21/00* | (2006.01) |
| *E21B 33/138* | (2006.01) |
| *C09K 8/516* | (2006.01) |

(52) U.S. Cl.
CPC ............... *C09K 8/035* (2013.01); *C09K 8/08* (2013.01); *C09K 8/32* (2013.01); *C09K 8/502* (2013.01); *C09K 8/508* (2013.01); *C09K 8/514* (2013.01); *C09K 8/516* (2013.01); *C09K 8/565* (2013.01); *C09K 8/57* (2013.01); *C09K 8/5758* (2013.01); *E21B 21/003* (2013.01); *E21B 33/138* (2013.01)

(58) Field of Classification Search
CPC ......... C09K 8/035; C09K 8/08; C09K 8/5758
USPC ....................................................... 507/209
See application file for complete search history.

(56) References Cited

U.S. PATENT DOCUMENTS

| | | | | |
|---|---|---|---|---|
| 2,857,351 A | * | 10/1958 | Carroll | C08L 95/00 523/335 |
| 3,302,719 A | | 2/1967 | Fischer et al. | |
| 3,319,716 A | | 5/1967 | Dill et al. | |
| 3,322,668 A | * | 5/1967 | Fontenot | C09K 8/22 507/126 |
| 3,789,927 A | | 2/1974 | Gurley et al. | |
| 4,157,982 A | * | 6/1979 | Clemons | C08L 93/04 516/66 |

(Continued)

OTHER PUBLICATIONS

Technical Data Sheet of Dymerex of EASTMAN, 2018.*

(Continued)

*Primary Examiner* — Aiqun Li
(74) *Attorney, Agent, or Firm* — Osha Liang LLP (57) ABSTRACT

Wellbore strengthening compositions may include a base fluid; and a solid gum rosin additive, wherein the solid gum rosin additive has an average particle size of 1 μm to 15 mm. Methods may include emplacing a wellbore fluid containing a solid gum rosin additive into a wellbore, wherein the solid gum rosin additive has an average particle size of 1 μm to 15 mm.

21 Claims, 2 Drawing Sheets

(56) References Cited

U.S. PATENT DOCUMENTS

| | | | | |
|---|---|---|---|---|
| 4,192,753 | A | | 3/1980 | Fischer et al. |
| 4,477,613 | A | * | 10/1984 | Evans .................... C08L 93/04 524/187 |
| 4,888,141 | A | * | 12/1989 | Bastiaansen .............. B29B 9/16 264/480 |
| 5,441,562 | A | * | 8/1995 | Broich ................... C09J 103/02 106/147.6 |
| 5,741,889 | A | * | 4/1998 | Huang ...................... C08J 3/03 106/238 |
| 2005/0203228 | A1 | * | 9/2005 | Aarts ...................... C08K 5/10 524/306 |
| 2007/0079730 | A1 | * | 4/2007 | Puckett ................... C03C 25/26 106/218 |
| 2010/0222455 | A1 | * | 9/2010 | Dowel ................. B29C 73/163 523/166 |
| 2014/0290330 | A1 | | 10/2014 | Blue |

OTHER PUBLICATIONS

Technical Data Sheet of Poly-pale of EASTMAN, 2018.*
International Preliminary Report on Patentability issued in International Application No. PCT/EP2016/077602; dated May 24, 2018 (9 pages).

* cited by examiner

WELLBORE STRENGTHENING ADDITIVE AND USES THEREOF

CROSS REFERENCE TO RELATED APPLICATIONS

This application claims the benefit of U.S. Provisional Application No. 62/255,088 filed on Nov. 13, 2015, incorporated by reference herein in its entirety.

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

However, for a wellbore fluid to perform all of its functions and allow wellbore operations to continue, the fluid must stay in the borehole. Frequently, undesirable formation conditions are encountered in which wellbore fluids may be lost to the formation. For example, wellbore fluid can leave the borehole through large or small fissures or fractures in the formation or through a highly porous rock matrix surrounding the borehole. Thus, fluid loss or lost circulation is a recurring drilling problem, characterized by loss of wellbore fluids into downhole formations that are fractured, highly permeable, porous, cavernous, or vugular. Other problems encountered while drilling and producing oil and gas include stuck pipe, hole collapse, loss of well control, and loss of or decrease in production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to wellbore strengthening compositions that may contain a base fluid; and a solid gum rosin additive, wherein the solid gum rosin additive has an average particle size of 1 μm to 15 mm.

In another aspect, methods in accordance with the present disclosure may include emplacing a wellbore fluid containing a solid gum rosin additive into a wellbore, wherein the solid gum rosin additive has an average particle size of 1 μm to 15 mm.

Other aspects and advantages of the invention will be apparent from the following description and the appended claims.

DETAILED DESCRIPTION

In one aspect, the present disclosure is directed to gum rosin additives that may be incorporated into a wellbore fluid to strengthen sections of a wellbore, and combat borehole instability and increase risks of collapse that may occur when operating in fracture prone formations such as shale, or in unconsolidated formations. Wellbore strengthening may minimize or reduce the risk of lost fluid circulation, and may be used to improve zonal isolations and sealing applications.

Gum rosin additives in accordance with the present disclosure may be used with aqueous-based or oleaginous-based wellbore fluids. When formulated in an oleaginous wellbore fluid, gum rosin additives may increase viscosity profiles and gel strength. Gum rosin additives in accordance with the present disclosure may also generate a filter cake on the walls of a wellbore that prevents or reduces fluid flow in or out of the wellbore, and increases the mechanical stability of the near-wellbore formation in treated intervals. Reinforced filter cakes may be prevent damage that occurs during drilling operations such as when passing a drill string through narrow boreholes, and may mitigate the risk of pack-offs occurring while removing drill strings and other equipment. Gum rosins in accordance with the present disclosure may have fracture filling and gluing properties, without adversely affecting mud rheology.

Gum rosin additives may also be capable of withstanding elevated temperatures and hot-aging without degrading or diminishing in effectiveness. While not limited to a particular theory, it is believed that gum rosin additives may also undergo some degree of activation when exposed to formation temperatures. For example, temperatures downhole may be in the range of 40° C. to 150° C., which may cause gum rosins to reach a softening temperature in which the solid additive begins to sinter and turn from a solid to a viscous liquid that can glom and accumulate on a formation surface exposed in the borehole. The gum rosin may then form a filter cake useful for curing lost circulation and enhancing wellbore consolidation downhole.

If used for proppant flow back control, the gum rosin may be pumped downhole through an open ended drill pipe or a turning drill bit, and the temperature at the drill hit and the circulating temperature may be at or above the softening temperature, which may cause a phase transition of the gum rosin from solid to viscous liquid. When the activated gum rosin then enters fluid circulating through the wellbore, it may then attract solids and other additives present in the wellbore fluid that may also be deposited as a filter cake.

In some embodiments, gum rosin compositions may be continuously present in a wellbore fluid, such as when used as a drilling fluid or displacement fluid, or spotted as a pill or treatment fluid when fluid loss is detected or anticipated. In some embodiments, wellbore fluid compositions in accordance with the instant disclosure may be applied to an interval of a wellbore as a fluid "pill." As used herein, the term "pill" is used to refer to a relatively small quantity (typically less than 200 bbl) of a special blend of wellbore fluid to accomplish a specific task that the regular wellbore fluid cannot perform. In one specific embodiment, the fluid composition may be used to plug thief zones or other regions where circulating fluids are being lost into the formation.

Upon emplacement within the wellbore, a pill containing a gum rosin additive may be defluidized and lose a substantial portion of the base fluid to the formation such additives present in the pill form a plug or seal having sufficient compressive and shear strength for the particular application. Subsequent to placement, the pill may be defluidized to lose a substantial portion of the base fluid and the gum rosin additive may form a plug or seal having sufficient compressive strength for the particular application, which may also increase the tensile strength of the formation rock.

Gum Rosin

In one or more embodiments, wellbore fluids may contain a gum rosin additive that may aid in controlling fluid loss and strengthen unconsolidated or poorly consolidated sections in a wellbore. Gum rosins may show strong adherence to formations and generate a semisolid filter cake. Prior to addition to a wellbore fluid, gum rosins in accordance with the present disclosure may be in solid particulate form having properties similar to a thermoplastic. In some embodiments, gum rosin additives in accordance with the present disclosure may also have a negligible or limited environmental impact.

In one or more embodiments, gum rosins in accordance with the present disclosure may be low molecular weight gums produced from natural sources including various species of pine tree, such as Pinus eliotti. Gum rosins may contain a neutral fraction containing a number of terpenes as well as rosin acid component. Gum rosins in accordance with the present disclosure may also contain a mixture of resin acids including abietic acid, pimaric acid, isopimaric acid, neoabietic acid, dihydroabietic acid, and dehydroabietic acid. In some embodiments, the gum rosins may have an acid number in the range of 120 to 170.

Gum rosins in accordance with the present disclosure may have an activation or softening point in the range of 25° C. to 75° C. and may be fully fluid at 120° C. However, the addition of various activators and solvents may modify the softening point of the resin. For example, in one or more embodiments, gum rosins may be activated with rosin activators including halide activators such as organic halide salts, including dimethylammonium chloride and diethylammonium chloride, and organic acids including monocarboxylic acids such as tannic acid, acetic acid, propionic acid, and dicarboxylic acids such as oxalic acid, malonic acid, sebacic acid.

Gum rosins may also be formulated with one or more mutual solvents as an activator including as glycol ether solvents such as diethylene glycol diethyl ether, diethylene glycol dimethyl ether, diethylene glycol dibutyl ether, diethylene glycol monomethyl ether, diethylene glycol monoethyl ether, diethylene glycol monobutyl ether, tri-ethylene glycol monomethyl ether, triethylene glycol dimethyl ether, ethylene glycol diethyl ether, ethylene glycol monoethyl ether, ethylene glycol monobutyl ether, ethylene glycol dibutyl ether, and the like. Other mutual solvents may include low molecular weight alcohols, esters of fatty acids such as isopropyl myristate, isopropyi oleate, rapeseed methyl esters, and the like.

Gum resins may be chemically modified in some embodiments, such as through esterification, polymerization, or hydrogenation. In some embodiments, gum rosins may be esterified with glycerol or ethanol. Chemical modification of gum rosins may increase thermal stability, solution viscosity, and residue or filter cake hardness. Rosin can be also converted to a water-soluble rosin flux, by formation of an ethoxylated rosin amine, an adduct with a polyglycol and an amine.

In one or more embodiments, the gum rosin may have an average particle size, as determined by laser diffraction, sedimentation, or microscopy, for example, that ranges from a lower limit selected from 1 μm, 5 μm, 10 μm, 25 μm, 50 μm, or 100 μm, to an upper limit selected from 500 μm, 1 mm, 5 mm, 10 mm, and 15 mm where the average particle size may range from any lower limit to any upper limit. The particle size of the gum rosin may be on the order of 200-400 mesh in some embodiments, or 500 mesh or finer in other embodiments. Gum rosin particulates may be prepared by a number of methods including centrifugal or gas atomization or other conventional methods.

Gum rosin may be added to a wellbore fluid at a percent by weight of wellbore fluid (wt %) may range from 15 wt % to 55 wt % in some embodiments, and from 5 wt % to 50 wt % in other embodiments.

Latex Additives

In one or more embodiments, gum rosins may be combined with a latex into a wellbore formulation to create a composition that interacts synergistically to form a filter cake that exhibits increased adherence to the formation. As known in the art, latex is an emulsion or sol in which the colloidal particles are polymeric particles.

In one or more embodiments, latexes may be derived from polymers prepared from a varied selection of monomers including aromatics, acrylates and methacrylates, and amine monomers. Latexes in accordance with the present disclosure may be prepared from homopolymers, copolymers and higher order polymers such as ter-polymers, quater-polymers, and the like.

Monomers may include aromatic species including styrenes such as o-, m-, and p-methyl styrenes, o-, m-, and p-ethylstyrenes, 2,4-dimethylstyrene, 2,4-di-ethylstyrene, 2-methyl-4-ethylstyrene, alpha-methylstyrene, alpha-ethylstyrene, alpha-methyl-Z-methylstyrene, alpha-methyl-4-methylstyrene, alpha-methyl-2,4-dimethylstyrene and the like. Latex polymers may also include acrylate and methacrylates, and alkyl esters of acrylic and methacrylic acids. Amine monomers in accordance with the present disclosure may include amino derivatives of lower alkyl acrylic or methacrylic monomers such as alkyl acrylamides and methacrylamides, and aliphatic amino alkyl methacrylates and acrylates such as 2(dimethyiamino)ethyl acrylate or methacrylate, N-tert-butyl-2-aminoethyl methacrylate, amine substituted styrenes such as 4-vinyl-benzylamine and 4-vinyl aniline, and similar vinyl amine species. Other possible monomers that may be incorporated into latex polymers may include vinyl esters of fatty acids, acrylonitrile, styrene, vinyl chloride, vinylidene chloride, tetrafluoroethylene and other mono-olefinically unsaturated monomers.

In some embodiments latexes may be prepared from polymers that include alkyl-acrylate-co-acetate, polyhydroxyalkanoate, polyvinyl acetate, styrene acrylate amine terpolymers, styrene-co-acrylates, styrene acrylate methacrylate terpolymers, and styrene-co-amine polymers. Latexes may also be formulated to contain natural polymers such as starches derived from both root and cereal sources such as corn, potato, tapioca, wheat, waxy sorghum, waxy maize, grain sorghum, and rice, and natural latexes such as polyisoprene and derivatives and copolymers thereof.

Latexes may also include one or more surfactants known in the art. Latexes may be hydrophobic in nature and may tend to form discrete particles in aqueous solutions to minimize interaction with water. Surfactants may be added in some embodiments to stabilize the polymer in solution and to improve the interaction of the polymer with aqueous fluids. Surfactants in accordance with the present disclosure may include, for example, anionic and/or nonionic surfactants that may stabilize the latex-containing copolymer by electrostatic repulsion or steric stabilization, respectively.

Suitable anionic surfactants that may be used include the fatty alcohol sulfates such as the sulfites of alcohols having from 8 to 18 carbon atoms such as sodium lauryl sulfate, ethoxylated fatty alcohol sulfates, sulfonated alkyl aryl compounds such as sodium dodecylbenzene sultanate, and fatty acids having 8 to 18 carbon atoms. Examples of nonionic surfactants include alkylphenoxypolyetboxyethanols having alkyl groups of about 7 to 18 carbon atoms and about 9 to 40 or more oxyethylene units such as octylphenoxypolyethoxyethanols, dodecylphenoxypolyethoxyethanols; ethylene oxide derivatives of long-chain carboxylic acids, such as laurie, myristic, palmitic, and oleic acids; ethylene oxide condensates of long-chain alcohols such as lauryl or cetyl alcohol, and the like. In one or more embodiments, surfactants may be used in an amount ranging from 0.2 to 5 weight percent of the wellbore fluid (wt %).

In one or more embodiments, one or more latex additives may be added to a wellbore fluid at a concentration that ranges from gum rosin may be added to a wellbore fluid at a percent by weight of wellbore fluid (wt %) may range from 2.5 wt % to 55 wt % in some embodiments, and from 5 wt % to 50 wt % in other embodiments.

In some embodiments, wellbore strengthening compositions may be selected based on the environmental safety constraints in place in the given region in which the wellbore operation takes place. For example, one measure of sample toxicity is marine biodegradation data as outlined in Organization for Economic Cooperation and Development, Procedure OECD 306 or BODIS. Under OECD 306, the rules that governing offshore chemical use set forth three tests: bioaccumulation, biodegradation and toxicity. In order for a chemical to be used without restriction offshore in the North Sea it must satisfy two of the following three criteria: (1) biodegradation must be greater than if less than 20% it is automatically marked for substitution; (2) bioaccumulation as measured by octanol/water partitioning coefficient (log Po/w) must be below 3 (or have a molecular weight>700); and (3) toxicity to the most sensitive marine species (often *Skeletonema*) must be greater than LC50 or EC50 of 10 ppm. In order to comply with these constraints, wellbore strengthening compositions in some embodiments may be selected such that the average molecular weight ($M_w$) of the constituent components may be greater than 700 Da and/or meet the requirements for biodegradation and aquatic toxicity.

In one or more embodiments, wellbore strengthening compositions of the present disclosure may include citric acid derivative plasticizer, wherein at least one of the carboxylic acid functional groups of the citric acid nucleus is esterified with a C1 to C12 alcohol, and wherein the hydroxyl group of the citric acid nucleus is unfunctionalized or esterified with a C1 to C12 carboxylic acid. In some embodiments, citric acid derivative plasticizers may include tributyl citrate esters, acetyl-tri-n-hexyl citrate, acetyl-tri-n-hexyl citrate, acetyl-tri-n-octyl citrate, acetyl-tri-n-decyl citrate, acetyl tributyl citrate, acetyl trihexyl citrate, butyryl trihexyl citrate esters. It is also envisioned that other conventional plasticizers may be used depending on the application and environmental requirements, for example.

In one or more embodiments, filter cakes formed may be characterized by the frictional force exhibited when measured by scratch testing methods described in U.S. Pat. Pub. 2014/0290330. Filter cakes created by wellbore fluids in accordance with the present disclosure may exhibit a peak adhesive force that ranges from a lower limit selected from 30 g, 50 g, 75 g, or 100 g, to an upper limit selected from 150 g, 300 g, 400 g, or 600 g, where the peak adhesive force may range from any lower limit to any upper limit.

Base Fluid

In one embodiment, the wellbore fluid may be an invert emulsion fluid that may include a non-oleaginous internal phase and an oleaginous external phase. The non-oleaginous internal phase may include the multiple latex compositions and optionally be formed from a high density brine solution, which can serve as a weighting agent. The oleaginous external phase may include an oleaginous fluid such as diesel or other suitable hydrocarbon or synthetic oil, and an emulsifier. Optionally other components of the wellbore fluid may include a viscosifying agent, a wetting agent, and a cleaning agent.

The oleaginous fluid used for formulating the invert emulsion fluids used in the practice of the present disclosure are liquids such as a natural or synthetic oil. In one or more embodiments, the oleaginous fluid is selected from the group including diesel oil, mineral oil, a synthetic oil, such as hydrogenated and unhydrogenated olefins including poly-alpha olefins, linear and branch olefins and the like, polydiorganosiloxanes, siloxanes, or organosiloxanes, esters of fatty acids, specifically straight chain, branched and cyclical alkyl ethers of fatty acids. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid may be at least about 30 percent, 40 percent, or 50 percent by volume of the total fluid. In one embodiment, the amount of oleaginous fluid is from about 30 to about 95 percent by volume or from about 40 to about 90 percent by volume of the invert emulsion fluid.

The non-oleaginous fluid also used in the formulation of the invert emulsion fluids is a liquid, such as an aqueous liquid. In one or more embodiments, the non-oleaginous fluid may be selected from the group including sea water, a brine containing organic and/or inorganic dissolved salts, liquids containing water-miscible organic compounds and combinations thereof. The amount of the non-oleaginous fluid is generally less than the theoretical limit needed for forming an invert emulsion. In various embodiments, the amount of non-oleaginous liquid is at least about 1, 5, or 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume such as from about 1% to about 70% by volume. In another embodiment, the non-oleaginous fluid is preferably from about 10% to about 60% by volume of the invert emulsion fluid.

In some embodiments, the non-oleaginous fluid is a brine containing salts of alkali and alkaline earth metals. For example, brines formulated with high concentrations of sodium potassium, or calcium salts of the halides, formate, acetate, nitrate, and the like; cesium salts of formate, acetate, nitrate, and the like, as well as other compounds that should be well known to one of skill in the art.

The invert emulsion fluids of the present application may further contain additional chemicals depending upon the end use of the fluid so long as they do not interfere with the functionality of the fluids (particularly the emulsion when using invert emulsion fluids) described herein. For example, weighting agents, wetting agents, organophilic clays, viscosifiers, fluid loss control agents, surfactants, dispersants, interfacial tension reducers, pH buffers, mutual solvents, thinners, thinning agents and cleaning agents may be added to the fluid compositions of this invention for additional functional properties. The addition of such agents should be well known to one of ordinary skill in the art of formulating wellbore fluids and muds.

In particular, the wellbore fluids of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

Upon introducing a wellbore fluid of the present disclosure into a borehole, a filter cake may be formed which provides an effective sealing layer on the walls of the borehole preventing undesired invasion of fluid into the formation through which the borehole is drilled. Filter cakes formed from wellbore fluids disclosed herein include multiple latex polymers and may have unexpected properties. Such properties may include increased pressure blockage, reliability of blockage, and increased range of formation pore size that can be blocked. These filter cakes may provide filtration control across temperature ranges up to greater than 400° F.

Where the formation is a low permeability formation such as shales or clays, the filler cakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filter cakes formed by wellbore fluids of the present disclosure may effectively seal earthen formations, and may be stable at elevated temperatures.

EXAMPLES

In the following examples, the wellbore strengthening and fluid loss properties of various wellbore fluids formulated with gum rosin additives in accordance with the present disclosure were studied.

Example 1

Performance of Aqueous Wellbore Fluid Formulation

In the following example, a wellbore was formulated in accordance with the present disclosure from a water-based wellbore fluid as shown in Table 1.

TABLE 1

Aqueous wellbore fluid formulation for Example 1

| Component | Function | Conc. g/l |
|---|---|---|
| NaCl brine 1.20 sg | Base fluid | 887 |
| mixed diamine | Clay Inhibitor | 80 |
| modified starch | fluid loss control agent | 15 |
| xanthan gum | viscosifier | 4 |

TABLE 1-continued

Aqueous wellbore fluid formulation for Example 1

| Component | Function | Conc. g/l |
|---|---|---|
| barite | weight material | 440 |
| anti-accretion additive | Anti-accretion | 73 |

Wellbore fluid formulations were also prepared with a gum rosin additive CAS Number 8050-09-7 obtained from Sigma Aldrich (St. Louis. Mo.). Prior to use, the rosin gum additive was ground in a mortar and sieved through a 500 micron sieve prior to adding 50 g/L and 100 g/l to samples of the aqueous wellbore fluid. When mixed, the formulations with the gum rosin tolerated hot rolling without separation or rheological change.

Next, filter cakes were generated on an aloxite disk to determine the adherence properties of the filter cakes to a substrate that approximated a formation surface. Filter cakes were prepared from an aqueous wellbore fluid formulations supplemented with 100 g/l gum rosin. During testing, the wellbore fluid was placed on a water-saturated ceramic disk having an average 5-micron pore opening size in a double-ended HTHP fluid loss cell, and a filter cake was produced by applying a differential pressure of nitrogen at 500 psi at 100° C. for 2 hours. Spurt loss of the fluid was also measured during filter cake formation. Results are show in Table 2.

TABLE 2

Test data for aqueous formulation after aging at 100° C. for 16 hours

| HTHP Temperature | HTHP loss 2 hrs (mL) | Adherence |
|---|---|---|
| 25° C. | 7 | Low |
| 50° C. | 6.5 | Low |
| 75° C. | 4 | (Very) strong |
| 100° C. | 12.5 | (Very) strong |

The level of adherence was calculated based on a qualitative analysis of filter cake texture as shown in Table 3.

TABLE 3

Adherence measurements for filter cakes

| Cake Adherence | Cake Texture | Grade |
|---|---|---|
| No adherence | Removable in one layer | 0 |
| Low adherence | Removable in pieces, not pliable | 1 |
| Medium adherence | Semicontinuous peel | 2 |
| Strong adherence | Continuous peel | 3 |
| Very strong. Non removable film | Completely hardened | 4 |

As shown in Table 2, aqueous wellbore fluids supplemented with 100 gum rosin showed enhanced adherence when the temperature was increased into the 50 to 75° C. range, which may be a correlation with the softening point for the selected gum rosin.

Next, wellbore fluids were prepared with varying concentrations of gum rosin additive, and another sample was prepared containing a styrene-co-aerylate polymer latex. HTHP filter cakes were created as discussed above. The gum rosin containing filter cake achieved strong adherence and was almost completely hardened, particularly in combination with a styrene-co-acrylate polymer latex as shown in Table 4. The 600/3 rpm ratio increased from 7 to 8 for the aqueous base fluid formulation to approximately 10 for the fluids with the addition of the additives.

The results were repeated with a 30 min HTHP fluid loss test and the adherence scores were similar.

TABLE 4

| | | | | Test data after aging at 100° C. | | | | |
|---|---|---|---|---|---|---|---|---|
| Additive | Conc. | HTHP FL at 2 hrs (mL) | Adherence | Viscosity 600/3 rpm | pH | Trapped air | Accretion Arne | Cuttings Hardness Arne |
| Aqueous Base fluid | 0 | 14 | No/Low | 98/13 | 9+ | 21 | 23 | 150 |
| Latex | 100 g/l | 6 | Very strong | 107/13 | 9+ | 27 | 47 | 130 |
| Gum rosin | 50 g/l | 12.5 | Medium/ Strong | 95/10 | 7+ | 31 | 17 | 170 |
| Gum rosin | 100 g/l | 12.5 | Very strong | 125/13 | 6+ | 32 | 21 | 190 |
| Latex + Gum rosin | 50 g/l | 5 | Very Strong | 112/11 | 7+ | 30 | 22 | 170 |

Example 3

Accretion Inhibition

In the next example, wellbore fluids prepared substantially similarly to the aqueous fluid formulations discussed in Example 1 were assayed for accretion performance properties. Accretion is defined as the mechanism by which partially hydrated cuttings stick to parts of the bottom hole assembly and accumulate as a compacted, layered deposit. Accretion values are a measure of the mass accumulated on the bit during drilling, and lower accretion values are associated with enhanced penetration during drilling and reduced likelihood of bit balling.

During testing 350 mL of a drilling fluid formulation were added to a 500 ml bottle, along with a hollow steel bar. Next, 30 g of shale cuttings having an average size of about 4-6 mm were introduced to the mixture. Dynamic aging was then performed at room temperature for 10 minutes. Following aging, the hollow bar was removed from the bottle and gently washed with tap water. Solids were then scraped from the metal surface and weighed wet, and again when samples reached a constant weight at 105° C. The percent weight of day recovered was used as a measure of accretion.

The accretion values for each of the samples containing gum rosin additive alone, latex alone, and the combination of gum rosin and latex were approximately 20%, cuttings hardness≥150 torque/inch pounds, and 100% recovery for all fluids tested. All values recorded during testing were comparable to results regarded as high performance for accretion additives, which indicates that the wellbore strengthening additives do not interfere with anti-accretion additives and/or further improve accretion inhibition.

Example 4

Performance of Oleaginous Wellbore Fluid Formulation

In the next example, an oleaginous wellbore fluid was formulated as shown in Table 5 with a final specific gravity of 1.5.

TABLE 5

Oleaginous fluid formulation for Example 2

| Component | Function | Conc. g/l |
|---|---|---|
| mineral oil | base oil | 492 |
| fatty acid salt | emulsifier | 20 |
| bentonite clay | viscosifier | 20 |
| lime | alkalinity | 20 |
| rosin solution | fluid loss control agent | 10 |
| freshwater | — | 150 |
| CaCl$_2$ | — | 46 |
| barite | weight material | 737 |

Wellbore fluids were formulated and rheology was measured. Filter cakes were prepared as discussed in Example 1. A portion of the fluids were also stored at room temperature for three days and static sag was measured for all fluid samples. In the oleaginous fluid formulation, gum rosin exhibited strong to very strong adherence. The viscosity profile at low rpm was increased, but remained within an acceptable viscosity regime for wellbore fluids. Results are shown in Table 6. Similar adherence results were obtained when the HTHP fluid loss test was repeated for a 30 minute filter cake instead of a two hour.

TABLE 5

Test data after aging at 100° C. oleaginous fluid formulations

| Additive | Conc. | HTHP Loss 2 hrs (mL) | Adherence | Viscosity 600 rpm/ 3 rpm | 10 min gel | Static sag 3 days ΔMW |
|---|---|---|---|---|---|---|
| Base fluid | — | 4.0 | Low | 91/11 | 15 | 0.05 sg |
| Latex | 100 g/l | 3.0 | Medium/ Strong | 135/13 | 15 | 0.06 sg |
| Gum rosin | 50 g/l | 3.5 | Strong/ Very strong | 130/10 | 35 | 0.11 sg |
| Latex + Gum rosin | 50 g/l each | 3.5 | Strong | 89/6 | 25 | 0.09 sg |

Example 5

Scratch Testing

In the next example, a scratch tester was used to analyze the adhesion of wellbore fluids in accordance with the present disclosure. The following samples were tested using a scratch tester substantially similar to that described in U.S. Pat. Pub. 2014/0290330. Scratch testing is a form of friction testing in which friction as a function of time is recorded for a cylinder is dragged along a deposited filter cake. During testing, a filter cake is generated on a trough and a sled attached to a device that measures force and distance is placed within the trough. The sled is then dragged at a constant rate and a plot of frictional force as a function of time is generated. Increased friction values are a measure of the durability of the deposited filter cake, and a more durable filter cake will increase wellbore strength and prevent the movement of fluids into and out of a wellbore.

Filter cakes were generated from a water-based wellbore fluid as formulated in Table 1 according to standard HTHP filter press procedure. The hot HTHP filter cell was cooled prior to performing scratch test. During the test, the filter cake and 120 μm aloxite disk were fixed by clamps and the adherence strength was recorded. The increase in scratch strength by adding sealant is also confirmed by evaluating the filter cakes qualitatively after the scratch strength test.

Figure 1:
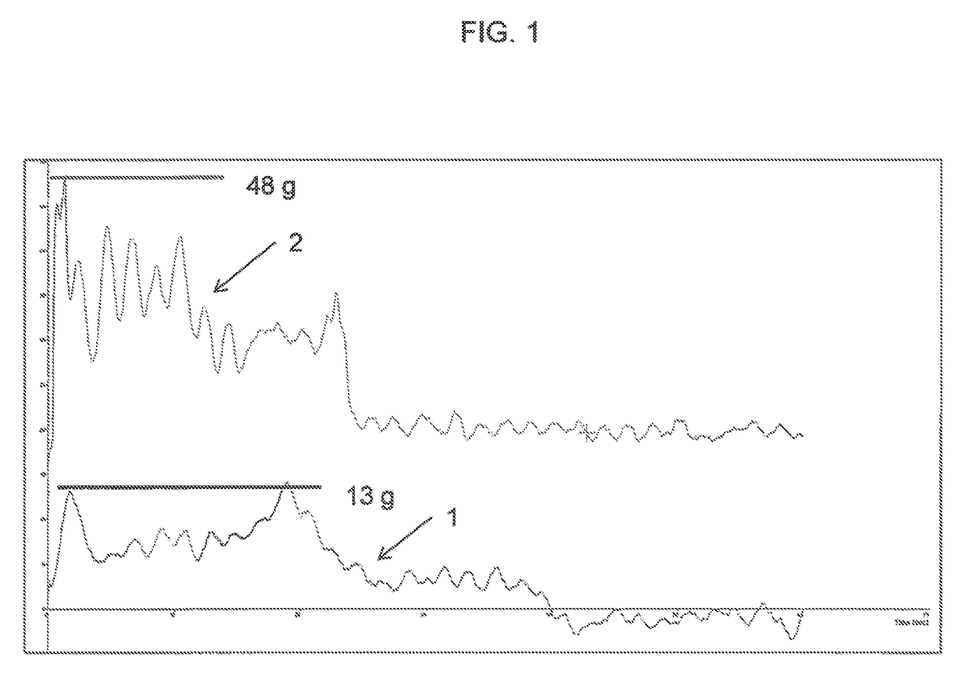
FIGS. 1 and 2 show results of a scratch test showing adhesion of wellbore fluids.
Figure 2:
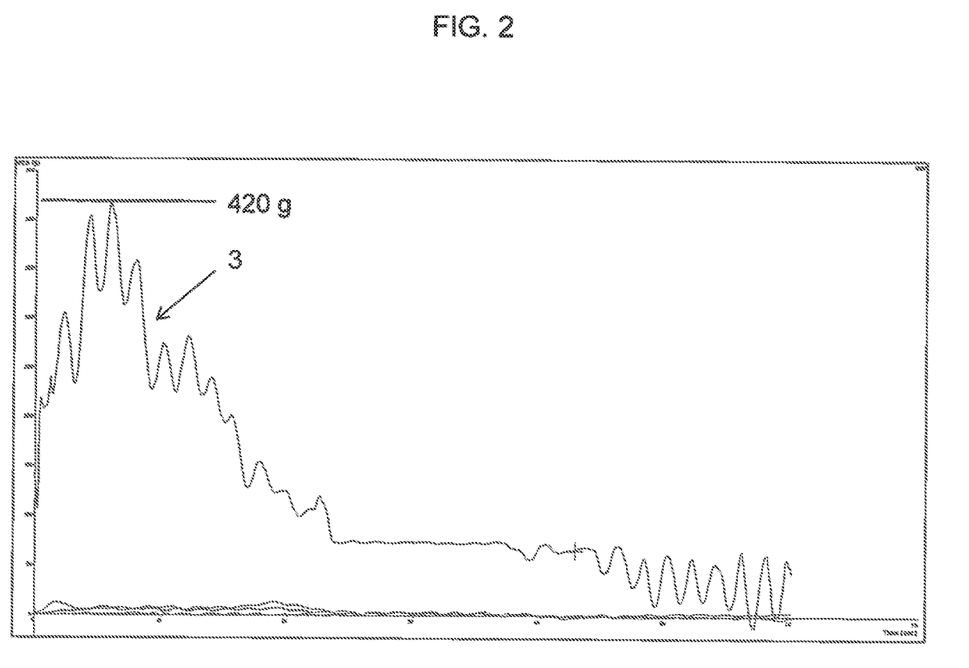

According to the testing data both fluids with additives obtain higher scratch test strength compared to the base mud. With particular respect to FIG. 1, a filter cake deposited from a water-based wellbore fluid 1 was measured over a testing period of 60 seconds with a peak force of 13 g. A qualitative analysis of sample 1 also showed little to no filter case adherence on the aloxite disk. A filter cake deposited from sample 2 containing 50 g/L (5 wt %) of gum rosin exhibited a peak force of 48 g as shown in FIG. 1, and possessed medium adherence in the qualitative analysis of adherence. With particular respect to FIG. 2, Sample 3 containing with 50 g/L rosin and 50 g/L latex exhibited a peak force of 420 g and very strong adherence by qualitative analysis.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A composition, comprising:
a base fluid;
a solid gum rosin additive, wherein the solid gum rosin additive has an average particle size of 1 μm to 15 mm and an acid number in the range of 120 to 170 and contains a mixture of one or more resin acids selected from the group consisting of abietic acid, primaric acid, isopimaric acid, neoabietic acid, dihydroabietic acid, and dehydroabietic acid;
at least one latex that is an emulsion or sol in which colloidal particles are polymeric particles; and
a barite weighting agent.

2. The composition of claim 1, wherein the base fluid is an oleaginous fluid.

3. The composition of claim 1, wherein the base fluid is an aqueous fluid.

4. The composition of claim 1, wherein the at least one latex is prepared from one or more polymers selected from a group consisting of alkyl-acrylate-co-acetate, styrene acrylate amine terpolymer, styrene-co-acrylate, styrene acrylate methacrylate terpolymer, styrene-co-amine polymer, polyhydroxyalkanoate, natural latex, starches, and polyvinyl acetate.

5. The composition of claim 4, wherein the concentration of the at least one latex is in a range of 2.5 wt % to 55 wt %.

6. The composition of claim 1, wherein the solid gum rosin additive is derived from *Pinus elliotti*.

7. The composition of claim 1, wherein the concentration of the solid gum rosin additive is in the range of 5 wt % to 50 wt %.

8. The composition of claim 1, wherein the solid gum rosin additive contains a mutual solvent.

9. The composition of claim 1, wherein the solid gum rosin additive further comprises a plasticizer.

10. The composition of claim 1, wherein the softening point of the solid gum rosin additive is in the range of 25° C. to 75° C.

11. A method, comprising:
emplacing into a wellbore a wellbore fluid comprising a solid gum rosin additive, wherein the solid gum rosin additive has an average particle size of 1 μm to 15 mm and an acid number in the range of 120 to 170 and contains a mixture of resin acids selected from the group consisting of abietic acid, pimaric acid, isopimaric acid, neoabietic acid, dihydroabietic acid, and dehydroabietic acid;
at least one latex that is an emulsion or sol in which colloidal particles are polymeric particles; and
a barite weighting agent.

12. The method of claim 11, further comprising forming a filter cake in the wellbore, wherein the filter cake formed exhibits a peak adhesive force in the range of 30 g to 600 g as measured by a scratch test.

13. The method of claim 11, wherein the base fluid is an oleaginous fluid.

14. The method of claim 11, wherein the base fluid is an aqueous base fluid.

15. The method of claim 11, wherein the concentration of the solid gum rosin additive is in the range of 5 wt % to 50 wt %.

16. The method of claim 11, wherein the softening point of the solid gum rosin additive is in the range of 25° C. to 75° C.

17. The method of claim 11, wherein the latex is prepared from one or more polymers selected from a group consisting of alkyl-acrylate-co-acetate, styrene acrylate amine terpolymer, styrene-co-acrylate, styrene acrylate methacrylate terpolymer, and styrene-co-amine polymer, polyhydroxyalkanoate, natural latex, starches, and polyvinyl acetate.

18. A composition, comprising:
a base fluid;
a solid gum rosin additive, wherein the solid gum rosin additive comprises particles having a particle size of 200-400 mesh or 500 mesh or greater and contain a neutral fraction containing a number of terpenes and a rosin acid component;
at least one latex that is an emulsion or sol in which colloidal particles are polymeric particles, wherein the at least one latex is prepared from one or more polymers selected from a group consisting of alkyl-acrylateco-acetate, styrene acrylate amine terpolymer, styrene-co-acrylate, styrene acrylate methacrylate terpolymer, styrene-co-amine polymer, and polyhydroxyalkanoate; and
a barite weighting agent.

19. The composition of claim 18, wherein the concentration of the at least one latex is in a range of 2.5 wt % to 55 wt %.

20. The composition of claim 18, wherein the composition further comprises at least one selected from the group consisting of organophilic clays, viscosifiers, fluid loss control agents, interfacial tension reducers, pH buffers, mutual solvents, thinners, and thinning agents and cleaning agents.

21. The composition of claim 18, wherein the softening point of the solid gum rosin additive is in the range of 25° C. to 75° C.

* * * * *